A. K. McQUADE.
TROLLEY POLE CONSTRUCTION.
APPLICATION FILED JUNE 4, 1910.
1,035,986.
Patented Aug. 20, 1912.
3 SHEETS—SHEET 1.
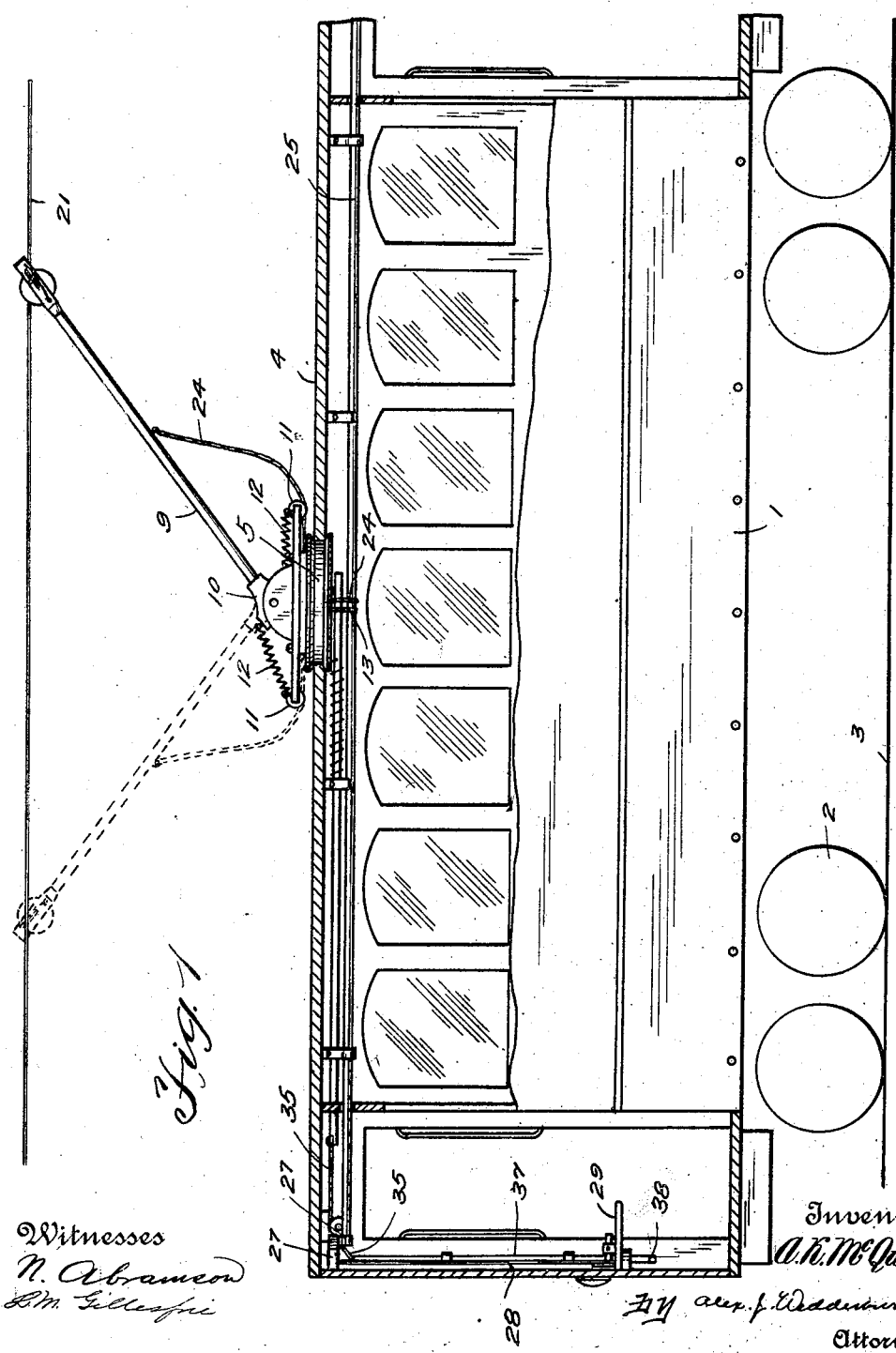

A. K. McQUADE.
TROLLEY POLE CONSTRUCTION.
APPLICATION FILED JUNE 4, 1910.
1,035,986.
Patented Aug. 20, 1912.
3 SHEETS—SHEET 2.
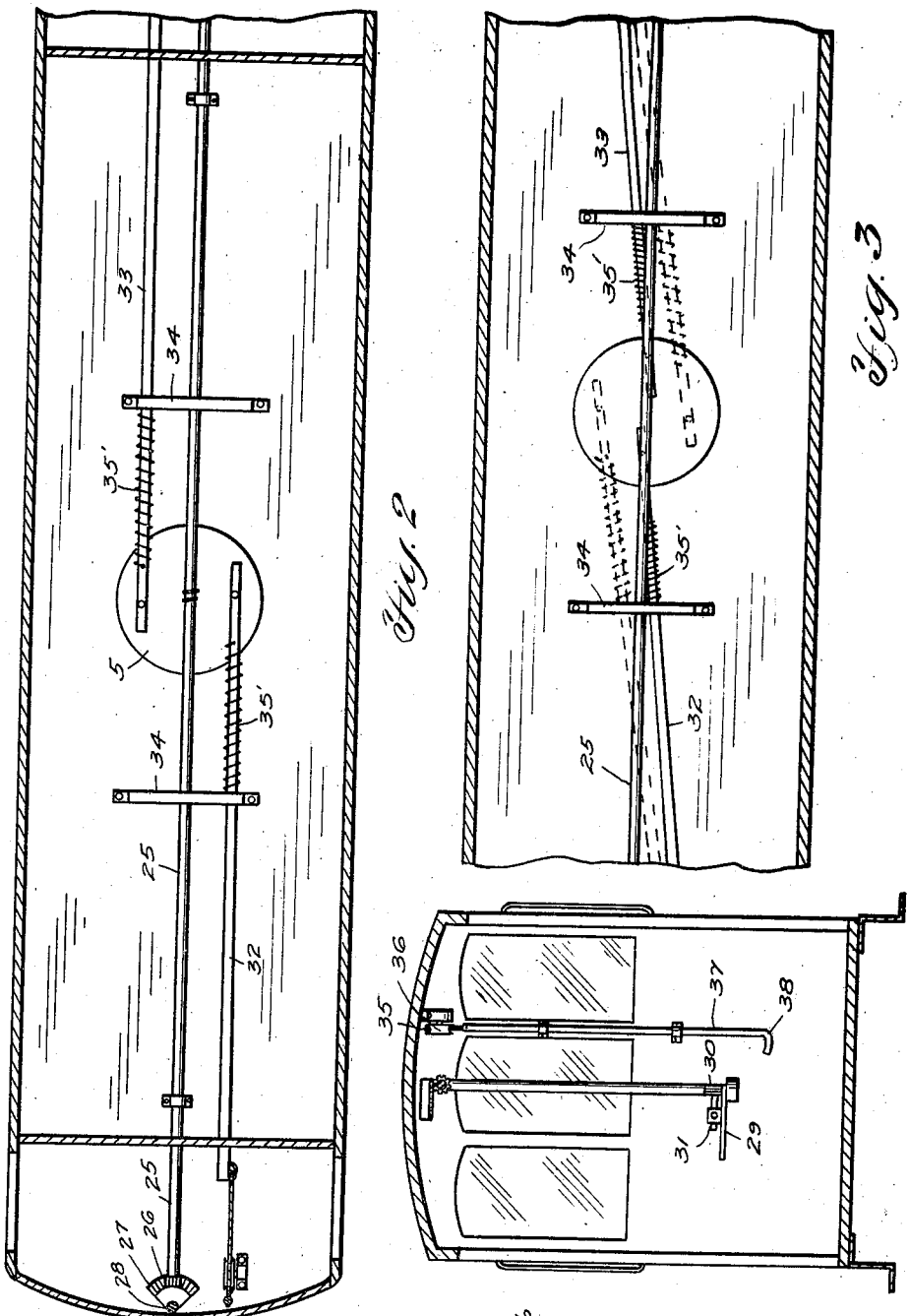

A. K. McQUADE.
TROLLEY POLE CONSTRUCTION.
APPLICATION FILED JUNE 4, 1910.
1,035,986.
Patented Aug. 20, 1912.
3 SHEETS—SHEET 3.
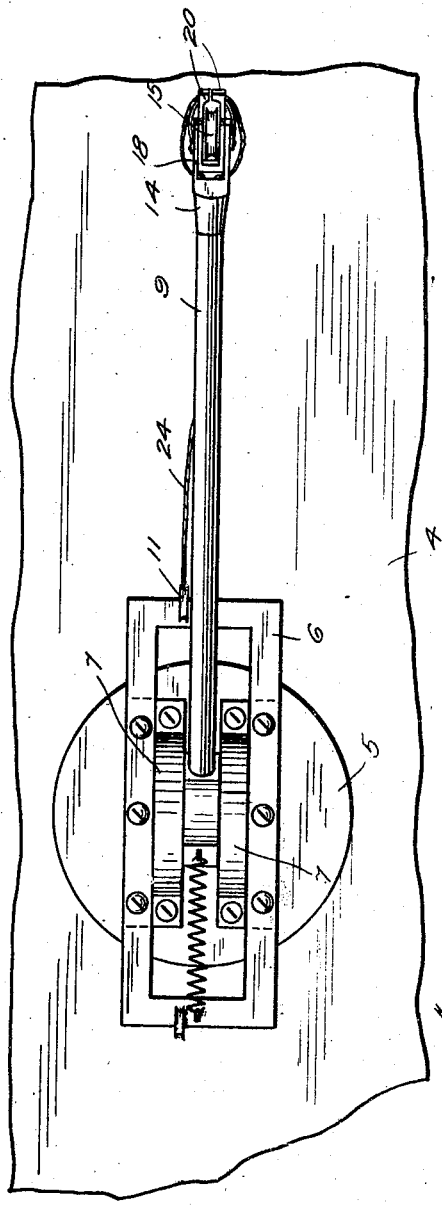
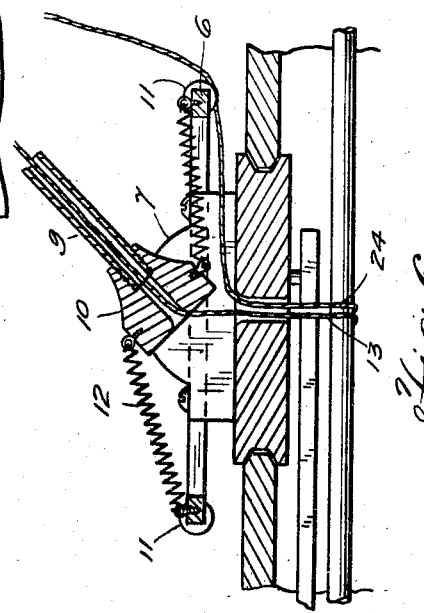
Witnesses
N. Abramson
L. M. Gillespie
Inventor
A. K. McQuade
Alex. J. Wedderburn, Jr.
Attorney

UNITED STATES PATENT OFFICE.

AUGUSTUS K. McQUADE, OF PITTSBURGH, PENNSYLVANIA.

TROLLEY-POLE CONSTRUCTION.

1,035,986.        Specification of Letters Patent.      Patented Aug. 20, 1912.

Application filed June 4, 1910. Serial No. 565,108.

*To all whom it may concern:*

Be it known that I, AUGUSTUS K. MCQUADE, citizen of the United States, residing at Pittsburgh, in the county of Allegheny and State of Pennsylvania, have invented certain new and useful Improvements in Trolley-Pole Constructions, of which the following is a specification.

This invention relates to improvements in trolley pole constructions and means for operating trolley poles from the interior of a car.

With the above and other objects in view the invention consists in certain combinations, constructions and arrangements of parts, clearly described in the following specification and clearly illustrated in the accompanying drawings, forming a part of the specification, and in which, Figure 1 is a side elevation, partly in section, showing the general arrangement of the pole operating means. Fig. 2 is a detail top plan view of the reversing rods, the car being shown in section to disclose the same, Fig. 3 is another detail view of the reversing rods, illustrating two positions of the rods, Fig. 4 is an end view of the car showing the vertical operating rods, Fig. 5 is a detail top plan view showing the mounting of the trolley pole, Fig. 6 is a detail sectional view showing the mounting of the trolley pole.

Referring to the accompanying drawings, which are intended for illustrative purposes, 1 denotes a passenger car having the usual trucks 2 adapted to move over the rails 3. On the top 4 of the car 1 a wheel 5, having a circumferential groove therein, is mounted, the rim of said wheel engaging the edges of an opening formed in the top of the car to receive the wheel. To the wheel 5 a rectangular frame 6 is secured, while between this frame and the wheel bearings 7 are secured. On the bearings 7 the trunnions 8 of the trolley pole 9 are journaled. The trolley pole 9 is secured to the trunnions 7 by a sleeve 10, integral with the trunnions, which has screw threads thereon. A roller 11 is pivoted to each end of the rectangular frame 6, and springs 12 connect each end of the frame 6 with the sleeve 10.

The trolley pole 9 is formed tubular to receive the operating cord or cable 13, which extends through the wheel 5 and through the pole to the upper end thereof. On the upper end of the pole 9 a terminal 14 is mounted. This terminal or head is also formed tubular and carries a trolley wheel 15.

The trolley pole is connected to a rope or cable 24, which is passed through the center of the wheel 5, with the cable or rope 13. The lower ends of both the cables or ropes 13 and 24 are fixed on the winding rod 25, which extends longitudinally of the car 1 and which is journaled at its ends to said car. One end or both ends of the operating and winding rod or shaft 25 are provided with a gear wheel 26, which engages with the gear segment 27, which gear segment is mounted on the upper end of the shaft 28. The shaft 28 is journaled to the rear end of the car 1, and on its lower end a handle 29 is secured. This lower end is formed with a ratchet gear 30, which ratchet gear is engaged by the pivoted pawl 31. By operating the vertical shaft or rod 28 the shaft or rod 25 can be rotated so as to open the jaws 19 and withdraw the wheel 15 from the conductor wire 21. The cord at cable 24 is arranged rather slack so that the pole will be lowered after the jaws are opened, the rope or cable 13 being arranged taut.

In order to reverse the wheel 5 on the roof or top 4 of the car, and the trolley pole with the wheel, two rods 32 and 33 are pivoted at opposite points to the underside of the wheel 5. The rods 32 and 33 work through the bearings 34, and are provided with coiled springs 35', which are secured to the shafts or rods 32 and 33 and press against the bearings 34. The outer ends of the rods 32 and 33 are connected to the operating ropes or cables 35, which are passed over the guide rollers 36, (only one of the ropes and rollers being shown) and are connected to the vertical rods 37, the lower ends of which are provided with foot engaging terminals 38. By quickly depressing either of the rods 37, so that the wheel 5 and the trolley pole 9 will be started in rapid motion the wheel can be turned one half a circle and the rods can be swung past the dead center.

Having described my invention I claim:—

1. In combination, means for mounting a trolley pole, a trolley pole mounted thereby, rods connected at opposite points to the means said rods adapted to reverse the means and the pole, cables connected with the rods, and vertically moving rods connected with the cables.

2. In combination, a trolley car having a turn table seated within an opening in its roof, a trolley pivotally mounted thereon, horizontal rods adapted to rotate said turn table, said rods being pivoted to said turn table, and cables secured to the free ends of said rods.

3. In combination, a trolley car having a turn table, seated within an opening in its roof, a trolley pivotally mounted thereon, horizontal rods adapted to rotate said turn table, said rods being pivoted to said turn table, cables secured to the free ends of said rods, and vertical rods mounted at the ends of said car adapted to operate said cables.

4. In combination, a trolley car having a turn table, seated within an opening in its roof, a trolley pivotally mounted thereon, horizontal rods adapted to rotate said turn table, said rods being pivoted to said turn table, cables secured to the free ends of said rods, springs each mounted on one of the ends of one of said horizontal rods and adapted to facilitate the movement thereof.

In testimony whereof I affix my signature in presence of two witnesses.

AUGUSTUS K. McQUADE.

Witnesses:
H. E. HUMRICHOUSE,
THOS. C. KEYS.

---

Copies of this patent may be obtained for five cents each, by addressing the "Commissioner of Patents, Washington, D. C."